(12) United States Patent
Zhang et al.

(10) Patent No.: US 12,179,448 B2
(45) Date of Patent: Dec. 31, 2024

(54) VULCANIZING EQUIPMENT

(71) Applicant: HIMILE MECHANICAL SCIENCE AND TECHNOLOGY (SHANDONG) CO., LTD, Shandong (CN)

(72) Inventors: Wei Zhang, Shandong (CN); Yang Zhao, Shandong (CN); Zhilan Liu, Shandong (CN); Riwen Sun, Shandong (CN); Longfei Gao, Shandong (CN); Qiang Fang, Shandong (CN); Daiping Liu, Shandong (CN)

(73) Assignee: Himile Mechanical Science and Technology (Shandong) Co., Ltd, Weifang (CN)

( * ) Notice: Subject to any disclaimer, the term of this patent is extended or adjusted under 35 U.S.C. 154(b) by 0 days.

(21) Appl. No.: 18/559,385

(22) PCT Filed: Sep. 23, 2022

(86) PCT No.: PCT/CN2022/120733
§ 371 (c)(1),
(2) Date: Nov. 7, 2023

(87) PCT Pub. No.: WO2023/103533
PCT Pub. Date: Jun. 15, 2023

(65) Prior Publication Data
US 2024/0227336 A1    Jul. 11, 2024

(30) Foreign Application Priority Data
Dec. 13, 2021    (CN) .......................... 202111523237.4

(51) Int. Cl.
*B29D 30/00*    (2006.01)
*B29D 30/06*    (2006.01)

(52) U.S. Cl.
CPC ..... *B29D 30/0654* (2013.01); *B29D 30/0606* (2013.01); *B29D 2030/0658* (2013.01);
(Continued)

(58) Field of Classification Search
None
See application file for complete search history.

(56) References Cited

U.S. PATENT DOCUMENTS

| | | | |
|---|---|---|---|
| 6,620,367 B1 * | 9/2003 | Mitamura | B29C 35/04 264/294 |
| 2019/0030847 A1 | 1/2019 | Thibault et al. | |

FOREIGN PATENT DOCUMENTS

| | | |
|---|---|---|
| CN | 109795060 A | 5/2019 |
| CN | 114179409 A | 3/2022 |

(Continued)

OTHER PUBLICATIONS

Morgan Falck, "What's the Difference Between Open, Semi-Open, and Closed Impellers?", Jun. 9, 2017 (Year: 2017).*

(Continued)

*Primary Examiner* — Jacob T Minskey
*Assistant Examiner* — Adrien J Bernard
(74) *Attorney, Agent, or Firm* — MEDLER FERRO WOODHOUSE & MILLS PLLC

(57) ABSTRACT

Techniques presented herein relate to vulcanizing equipment that includes a vulcanizing mold in which a vulcanizing cavity is formed, a vulcanizing bladder suitable for being placed in the vulcanizing cavity, and a supporting assembly that includes a center rod and a clamping device arranged on the center rod. The clamping device is suitable for installing the curing bladder in the cavity in a sealed manner. The vulcanizing equipment further includes a heating assembly and a gas circulation assembly that are arranged in the curing bladder in a stacked manner in the axial direction of the center rod. The gas circulation assembly is suitable for circulating a heated heating medium in the curing bladder. A driving assembly of the vulcanizing equipment includes a rotating shaft sleeve that is arranged on the outer side of the center rod in a clearance-fit manner and is connected to the gas circulation assembly.

14 Claims, 7 Drawing Sheets

(52) U.S. Cl.
   CPC ........... *B29D 2030/0659* (2013.01); *B29D 2030/0674* (2013.01)

(56) References Cited

FOREIGN PATENT DOCUMENTS

| | | |
|---|---|---|
| CN | 114179410 A | 3/2022 |
| CN | 216400631 U | 4/2022 |
| CN | 216443112 U | 5/2022 |
| CN | 216466332 U | 5/2022 |
| CN | 217124036 U | 8/2022 |
| CN | 217144985 U | 8/2022 |
| JP | 2012101553 A | 5/2012 |
| KR | 2005-0012336 A | 2/2005 |
| WO | 2013164282 A | 11/2013 |

OTHER PUBLICATIONS

Chinese Office Action dated Jul. 21, 2023 for Chinese Appl. No. 202111523237.4, with English translation (11 pages).
Chinese Notice of Allowance dated Sep. 1, 2023 for Chinese Appl. No. 202111523237.4, with English translation (2 pages).
International Search Report issued in PCT/CN2022/120733 mailed Nov. 24, 2022 (12 pages).
Korean Office Action in KR Appl. No. 10-2023-7038005 dated Feb. 27, 2024 with English Translation (20 pages).

\* cited by examiner

VULCANIZING EQUIPMENT

TECHNICAL FIELD

The present invention relates to the technical field of vulcanizing equipment, in particular to a vulcanizing equipment.

BACKGROUND

In industrial production, vulcanizing is often used to increase the overall hardness of certain materials.

Taking tire vulcanizing as an example, tire vulcanizing refers to the vulcanizing of the outer tire, which is vulcanized by mold pressurization. Before vulcanizing, the tire is a plastic rubber with viscoelasticity, which is easy to deform, has low strength, and has no use value. After vulcanizing, the plastic rubber is cured and becomes a high-elastic rubber with use value.

A conventional tire vulcanizing process uses a combination of saturated steam and nitrogen. Particularly, the raw tire is placed between a sealed vulcanizing bladder 2 and a vulcanizing mold, and saturated steam is introduced into the vulcanizing bladder 2 to provide the heat required for vulcanizing, and then high-pressure nitrogen is introduced to provide the pressure required for vulcanizing, and the vulcanizing bladder 2 expands and squeezes the raw tire, and cooperates with the vulcanizing machine to shape and vulcanize the raw tire to improve the strength of the tire. However, the steam may condense when it gets cold, creating condensed water accumulating at lower portion of the vulcanizing bladder 2, resulting in a large temperature difference between the upper and lower portions of the vulcanizing bladder 2, which will lead to the defect of incomplete vulcanizing of the tire. Further, steam pipelines will occupy a lot of space.

A tire vulcanizing equipment is provided in the prior art. As shown in FIG. 11, a heating assembly 5 is provided in the vulcanizing bladder 2 to directly heat the nitrogen gas so as to replace the saturated steam with the heated nitrogen gas, and a gas circulation assembly 6 is arranged in the vulcanizing bladder 2 to make the temperature distribution in the vulcanizing bladder 2 uniform. However, in the solution provided in the prior art, the heating assembly 5 and the gas circulation assembly 6 are arranged to be radially distributed in the vulcanizing bladder 2, that is, as shown in FIG. 11, the heating assembly 5 and the gas circulation assembly 6 are arranged horizontally, resulting in excessive radial space occupation inside the vulcanizing bladder 2. The radial space inside the vulcanized tire must be larger than the coverage of the horizontally arranged heating assembly 5 and gas circulation assembly 6, to guarantee normal vulcanizing processing, as a result of which the horizontally arranged equipment limits the processing specifications of vulcanized tires and is not suitable for processing tires with small inner diameters, and the horizontally arranged equipment is likely to hinder the flow of air in the vulcanizing bladder 2 along the horizontal direction, which is not beneficial to the gas circulation in the vulcanizing bladder 2.

SUMMARY

Therefore, the technical problem to be solved by the present invention is to overcome the defects in the prior art that the equipment with a vulcanizing bladder horizontally arranged occupies too much space, which limits the processing specifications of vulcanized tires, and is not beneficial to the gas circulation in the vulcanizing bladder.

To this end, the present invention provides a vulcanizing equipment, comprising: a vulcanizing mold configured to be able to open and close, within which a vulcanizing cavity is formed; a vulcanizing bladder suitable for placement in the vulcanizing cavity; a supporting assembly comprising a center rod and a clamping device arranged on the center rod, the clamping device being adapted to install the vulcanizing bladder in the cavity in a sealed manner; further comprising: a heating assembly and a gas circulation assembly arranged in the vulcanizing bladder in a stacked manner in the axial direction of the center rod, the gas circulation assembly being adapted to circulate a heating medium in the vulcanizing bladder; a driving assembly comprising a rotating shaft sleeve arranged outside the center rod and connected with the gas circulation assembly.

Optionally, the gas circulation assembly comprises: a venting member connected to the rotating shaft sleeve.

Optionally, the venting member is an open impeller, and the gas circulation assembly further comprises: a guide ring installed on the clamping device by a plurality of supporting blocks, wherein a gap is provided between two adjacent supporting blocks, and an air channel is formed between the venting member and the guide ring; an diffuser arranged at the air channel.

Optionally, the venting member is a closed impeller and has an air channel at which a diffuser is arranged.

Optionally, the heating assembly comprises a bracket and a heater arranged on the bracket, the bracket being arranged on the guide ring, and the heater being formed with a ventilation portion in a vertical direction.

Optionally, the heater is a heating coil.

Optionally, a sleeve is provided outside the heater, the sleeve being installed on the guide ring.

Optionally, the heating assembly comprises a bracket and a heater arranged on the bracket, a sleeve being arranged on the outside of the heater, wherein a support body is arranged on the outer peripheral side of the closed impeller, the bracket and the sleeve being arranged on the support body.

Optionally, the clamping device comprises: a ring seat on which an air passage pipeline is arranged, the rotating shaft sleeve passes through the ring seat with clearance fit and is connected with the venting member; a lower clamping ring installed on the ring seat, a lower end of the vulcanizing bladder being clamped between the lower clamping ring and the vulcanizing mold; an upper clamping ring installed on a protruding end of the center rod, an upper end of the vulcanizing bladder being clamped between the upper clamping ring and the vulcanizing mold; and a lower pressing ring is arranged between the lower clamping ring and the vulcanizing mold, and an upper pressing ring is arranged between the upper clamping ring and the vulcanizing mold.

Optionally, the diffuser comprises: an upper retaining ring in a conical shape; a lower retaining ring connected to the upper retaining ring by a plurality of guide pieces, wherein a wide end and a contracted end are formed between the upper retaining ring and the lower retaining ring, the wide end communicating with the air channel.

Optionally, the driving assembly further comprises a transmission member acting between the rotating shaft sleeve and a driving motor; the rotating shaft sleeve is arranged at outside of the center rod in a clearance fit manner.

Optionally, the transmission member is a gear pair comprising: a first gear arranged on the drive motor and rotates synchronously with a motor shaft; a second gear arranged on the rotating shaft sleeve and engages with the first gear.

Optionally, a wire-passing pipeline is provided on the ring seat, and a through hole is provided on the guide ring, and a wire is connected to the heating assembly through the wire-passing pipeline and the through hole.

The technical solution of the present invention has the following advantages: The present invention provides a vulcanizing equipment wherein the heating assembly and the gas circulation assembly are arranged in the vulcanizing bladder in a stacked manner in the axial direction of the center rod of the supporting assembly, that is, the heating assembly and the gas circulation assembly are arranged in the vertical direction outside the center rod, the heating assembly is used to heat the heating medium gas introduced into the vulcanizing bladder, and the gas circulation assembly being used to circulate the heated heating medium gas in the vulcanizing bladder.

Compared with the horizontal arrangement of heating assemblies and gas circulation assemblies in the prior art, the vulcanizing equipment provided by the present invention has the advantage that the heating assemblies and gas circulation components occupy less radial space in the vulcanizing bladder; on the premise that the internal radial space of the vulcanized tire must be greater than the coverage of the heating assembly and the gas circulation assembly, the heating assembly and the gas circulation assembly vertically arranged along the center rod axis of the supporting assembly can be applied to, but not limited to, the processing of tires with smaller inner diameter specifications because they occupy less radial space; and the heating assembly and gas circulation assembly arranged vertically along the axis of the center rod of the supporting assembly will not hinder the flow of air in the vulcanizing bladder, which is beneficial to the circulation of the heating medium gas in the vulcanizing bladder, improving the heat transfer efficiency and the temperature uniformity of the temperature field. At the same time, it is ensured that the heating medium gas passes through the heating assembly relatively uniformly in the vertical direction such that the heating efficiency is improved. The invention overcomes the defects in the prior art that the equipment with a vulcanizing bladder horizontally arranged occupies too much space, which limits the processing specifications of vulcanized tires, and is not beneficial to the gas circulation in the curing bladder.

The present invention provides a vulcanizing equipment, wherein the gas circulation assembly comprises: an venting member component connected to the rotating shaft sleeve; a guide ring installed on the clamping device through a plurality of supporting blocks, a gap arranged between two adjacent supporting blocks, wherein an air channel is formed between the venting part and the guide ring; and a diffuser arranged at the air channel.

The gas circulation component enables the heating medium gas to flow along the circulation path inside the bladder to ensure efficient heat exchange between the heating medium gas and the vulcanizing bladder, and improves the uniformity of temperature distribution in the temperature field to ensure the quality and efficiency of tire vulcanizing. The venting member in the gas circulation component can be selected from an open impeller or a closed impeller to provide power for the gas circulation of the heating medium. If an open impeller is selected, the guide ring cooperates with the supporting blocks and parts of the structure of the clamping device to form an air channel. The guide ring can guide the airflow generated by the venting member to converge. If a closed impeller is selected, it has an air channel itself, and the airflow entering the air channel is pressurized and guided by the diffuser disposed at the air channel, so that the heating medium gas can flow along the circulation path and at the same time flow in the circumferential direction, further improving the heat transfer efficiency and the temperature uniformity of the temperature field.

The present invention provides a vulcanizing equipment, the heating assembly comprises a bracket and a heater arranged on the bracket, the bracket being arranged on the guide ring, and the heater forming a ventilation portion in a vertical direction.

The heater is formed with a ventilation portion in the vertical direction, facilitating the heating medium gas in passing through the heater along the circulation path without being hindered, which ensures the smoothness of the heating medium gas circulation. Meanwhile, the heater can be arranged in multiple layers along the bracket, and each layer of heater can heat the heating medium gas circulating inside the vulcanizing bladder, that is, the heating medium gas circulating inside the vulcanizing bladder can be heated multiple times in one circulation, thereby improving the heating efficiency.

The present invention provides a vulcanizing equipment, wherein the heater is a heating coil.

There is a ventilation portion formed in the middle of the heating coil, facilitating the heating medium gas in passing through the circulation path without being hindered, which ensures the smoothness of the heating medium gas circulation.

Meanwhile, the heating coil is in the form of a multi-layer spirals suitable for hovering on the bracket, and each layer of heating coil can heat the heating medium gas circulating inside the vulcanizing bladder, that is, the heating medium gas circulating inside the vulcanizing bladder can be heated multiple times by the heating coil in one circulation, thereby improving the heating efficiency.

The present invention provides a vulcanizing equipment, wherein a sleeve is provided outside the heater, the sleeve being installed on the guide ring.

| A sleeve is arranged on the outside of the heater and is installed on the top of the guide ring and fits on the upper surface of the guide ring, which functions to guide the heating medium gas. The height of the sleeve is set to be higher than the heater, which facilitates in guiding the heating medium gas to be collected above the heater and enter the heater, thereby improving the smoothness of the heating medium gas circulation.

The present invention provides a vulcanizing equipment, the clamping device comprises: a ring seat, on which an air passage is arranged, and through which the rotating shaft sleeve passes with a clearance fit and is connected to the venting member; a lower clamping ring installed on the ring seat, a lower end of the vulcanizing bladder being clamped between the lower clamping ring and the vulcanizing mold; an upper clamping ring installed on the protruding end of the center rod, an upper end of the vulcanizing bladder being clamped between the upper clamping ring and the vulcanizing mold.

A clamping device is arranged to clamp and seal the vulcanizing bladder, thus avoiding the leakage of the heating medium gas in the vulcanizing bladder, which will reduce the vulcanizing quality of the vulcanizing equipment, and even make it impossible to perform vulcanizing operations. There is a air passage provided on the ring seat, which facilitates in passing in and out the heating medium gas in the vulcanizing bladder.

The present invention provides a vulcanizing equipment, wherein a lower pressing ring is arranged between the lower clamping ring and the vulcanizing mold, and an upper pressing ring is arranged between the upper clamping ring and the vulcanizing mold.

The lower pressure ring and the upper pressure ring are arranged to further seal the vulcanizing bladder, so as to improve the sealing performance of the vulcanizing bladder in the vulcanizing equipment.

The present invention provides a vulcanizing equipment, wherein the diffuser comprises an upper retaining ring in a conical shape; a lower retaining ring connected to the upper retaining ring via several guide pieces, wherein a wide end and a contracted end are formed between the upper retaining ring and the lower retaining ring, the wide end communicating with the air channel.

By forming a wide end and a contracted end between the upper retaining ring and the lower retaining ring, when the heating medium gas flows along the circulation path, the heating medium gas from the air channel pours into the contracted end from the wide end and flows out from the contracted end, as a result of which the flow rate and pressure of the medium gas are increased, the heat exchange efficiency between the heating medium gas and the vulcanizing bladder, the heater is improved at a high flow rate, and the guide pieces are also adapted to guide the heating medium gas in the circumferential direction of the vulcanizing bladder in the process of guiding the heating medium gas from the wide end to the contracted end, thereby further improving the temperature uniformity inside the vulcanizing bladder.

The present invention provides a vulcanizing equipment, wherein the driving assembly further comprises a transmission member acting between the rotating shaft sleeve and a driving motor.

The transmission member acts between the rotating shaft sleeve and the driving motor, power-connecting the driving motor and the rotating shaft sleeve, and the external power provided by the driving motor is transmitted to the rotating shaft sleeve and further transmitted to the venting member by the rotating shaft sleeve to provide power for the gas circulation of the heating medium gas.

The present invention provides a vulcanizing equipment, wherein the transmission member is a gear pair comprising a first gear arranged on the driving motor and rotating synchronously with the motor shaft, and a second gear arranged on the rotating shaft sleeve and engaged with the first gear.

The gear pair is used to facilitate power transmission and provide power for the gas circulation of the heating medium gas.

The present invention provides a vulcanizing equipment, wherein a wire-passing pipeline is provided on the ring seat, and a through hole is provided on the guide ring, and a wire is connected to the heating assembly through the wire-passing pipeline and the through hole.

The ring seat is provided with a wire-passing pipeline, and the guide ring is provided with a through hole, which facilitates in passing a wire, and is suitable for connecting an external power supply device with a heating assembly to provide heating power for the heater.

BRIEF DESCRIPTION OF THE DRAWINGS

In order to more clearly illustrate the technical solutions in the specific embodiments or prior art of the present invention, accompanying drawings that need to be used in the description of the specific embodiments or prior art are briefly described in the following. It is obvious that the accompanying drawings in the following description are some of the embodiments of the present invention, and that other drawings can be obtained on the basis of these accompanying drawings without any creative work for those skilled in the art.

REFERENCE LIST

Figure 1:
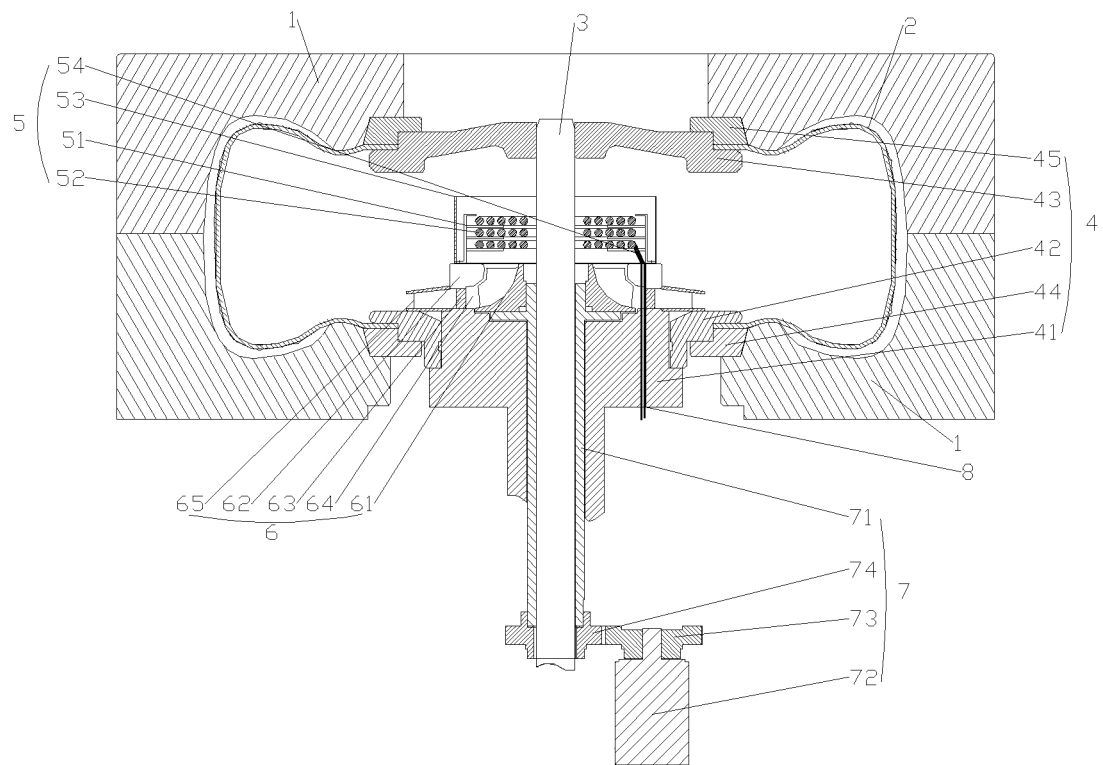
FIG. 1 is a schematic structural view of a vulcanizing equipment provided by the present invention.

1. Vulcanizing mold; 2. Vulcanizing bladder; 3. Center rod;
4. Clamping device; 41. Ring seat; 42. Lower clamping ring; 43. Upper clamping ring; 44. Lower pressure ring; 45. Upper pressure ring;
5. Heating assembly; 51. Bracket; 52. Heater; 53. Sleeve; 54. Wire;
6. Gas circulation assembly; 61. Venting member; 611. Guide vane; 62. Guide ring; 621. Through hole; 63. Supporting block; 64. Air channel; 65. Diffuser; 651. Upper retaining ring; 652. Lower retaining ring; 653. Guide piece; 654. Wide end; 655. Contracted end;
7. Driving assembly; 71. Rotating shaft sleeve; 72. Driving motor; 73. First gear; 74. Second gear; and
8. Wire-passing pipeline.

DETAILED DESCRIPTION

The technical solutions of the present invention will be clearly and completely described below in conjunction with the accompanying drawings. Apparently, the described embodiments are some of the embodiments of the present invention, not all of them. Based on the embodiments of the present invention, all other embodiments obtained by those skilled in the art without making creative efforts fall into the protection scope of the present invention.

In the description of the present invention, it should be noted that the orientation or positional relationship indicated by the terms "center", "upper", "lower", "left", "right", "vertical", "horizontal", "inside", "outside" and the like are based on the orientation or positional relationships shown in the accompanying drawings and are intended only to facilitate and simplify the description of the invention instead of indicating or implying that the device or element referred to must have a particular orientation, must be constructed and operate in a particular orientation, and therefore are not to be construed as limiting the invention. Furthermore, the terms "first", "second" and "third" are used for descriptive purposes only and are not to be construed as indicating or implying relative importance.

In the description of the present invention, it is to be noted that, unless otherwise expressly specified and limited, the terms "mount", "connect", "couple" shall be understood in a broad sense. For example, it can be a fixed connection, a removable connection, or an integral connection; it can be a mechanical connection or an electrical connection; it can be a direct connection or an indirect connection through an intermediate medium, and it can be a connection within two elements. Those skilled in the art can understand the specific meanings of the above terms in the present invention according to specific situations.

In addition, the technical features involved in different embodiments of the invention described below can be combined with each other as long as they do not conflict to each other Embodiment 1

This embodiment provides a vulcanizing equipment, as shown in FIGS. 1-9. In industrial production, vulcanizing is usually used to increase the overall hardness of certain materials. Taking tire vulcanizing as an example, tire vulcanizing refers to the vulcanizing of the outer tire, which is vulcanized by mold pressurization. Before vulcanizing, the tire is a plastic rubber with viscoelasticity, which is easy to deform, has low strength, and has no use value. After vulcanizing, the plastic rubber is cured and becomes a high-elastic rubber with use value.

Figure 11:
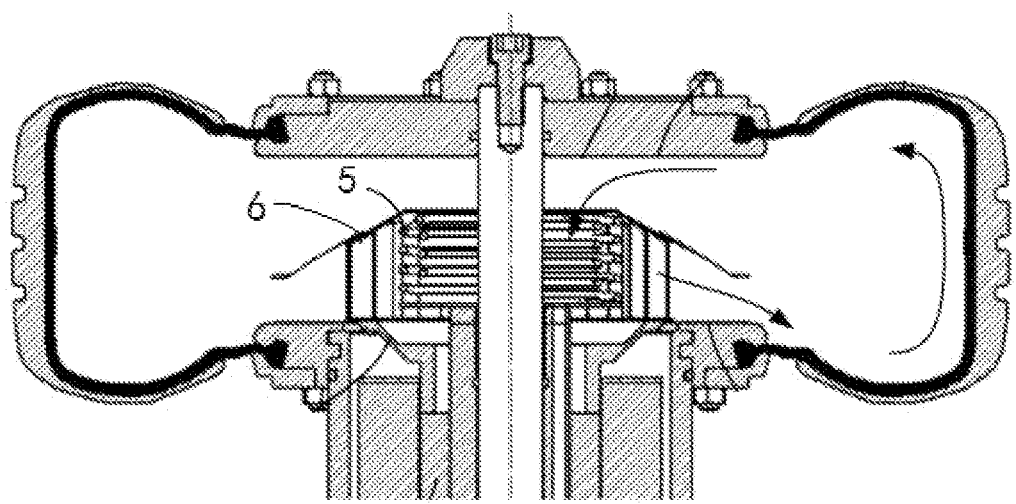
FIG. 11 is a schematic structural view of the tire vulcanizing equipment provided in the background of the present invention.

A tire vulcanizing equipment is provided in the prior art. As shown in FIG. 11, a heating assembly 5 is provided in the vulcanizing bladder 2 to directly heat the heating medium gas, and a gas circulation assembly 6 is provided in the vulcanizing bladder 2 to make the temperature distribution in the vulcanizing bladder 2 uniform. However, in the solution provided by this prior art, the heating assembly 5 and the gas circulation assembly 6 are radially arranged in the vulcanizing bladder 2, that is, as shown in FIG. 11, the heating assembly 5 and the gas circulation assembly 6 are arranged in the horizontal direction, resulting in excessive radial space occupation inside the vulcanizing bladder 2. The radial space inside the vulcanized tire must be larger than the coverage of the horizontally arranged heating assembly 5 and gas circulation assembly 6 to guarantee normal vulcanizing processing, as a result of which the horizontally arranged equipment limits the processing specifications of vulcanized tires and is not suitable for processing tires with small inner diameters, and the horizontally arranged equipment is likely to hinder the flow of air in the vulcanizing bladder 2 along the horizontal direction, which is not beneficial to the gas circulation in the vulcanizing bladder 2.

In this embodiment, the vulcanizing equipment comprises a vulcanizing mold 1, a vulcanizing bladder 2, a center rod 3, a clamping device 4, a heating assembly 5, a gas circulation assembly 6, a driving assembly 7, and so on.

The vulcanizing mold 1 is configured to be able to open and close, inside which a vulcanizing cavity is formed. From the perspective shown in FIG. 1, the vulcanizing mold 1 is in an upper-lower construction, in which after the upper part of the vulcanization mold 1 is separated from the central rod 3 that can be lifted and lowered and a portion of the clamping device 4 that engages the upper and lower parts of the vulcanization mold 1, the center rod 3 can be raised to contract the vulcanizing bladder 2, and the raw tire to be vulcanized is placed in the vulcanizing chamber, then the upper part of the vulcanizing mold 1 is lowered, such that the upper and lower parts of the vulcanizing mold 1 are closed. During the vulcanizing process, the vulcanizing machine provides clamping force for the vulcanizing mold 1.

The vulcanizing bladder 2 is suitable for being placed in the vulcanizing cavity. The vulcanizing bladder 2 is a hollow thin-walled rubber product of the vulcanizing machine, which is used to put the raw tire to be vulcanized and then introduce the heating medium into it, and cooperates with the vulcanizing machine to perform shaping and vulcanizing operations. The heating medium is any inert gas or rare gas, as long as it does not participate in the oxidation-reduction reaction, and further, in this embodiment, it is further optionally Nitrogen.

The supporting assembly comprises a center rod 3 and a clamping device 4 arranged on the center rod 3, the clamping device 4 being suitable for installing the vulcanizing bladder 2 in the cavity in a sealed manner;

Particularly, after the upper and lower parts of the vulcanizing mold 1 are separated, the center rod 3 can be raised, the raw tire to be vulcanized is placed in the vulcanizing chamber, and after the center rod 3 can be lowered, the vulcanizing mold 1 are closed when the upper part of the vulcanizing mold 1 is lowered. The clamping device 4 arranged on the center rod 3 is suitable for sealing the vulcanizing bladder 2 to avoid leakage of the heating medium gas.

The heating assembly 5 and the gas circulation assembly 6, as shown in FIG. 1, are arranged in the vulcanizing bladder 2 in a stacked manner in the axial direction of the center rod 3. From the perspective shown in FIG. 1, the heating assembly 5 and the gas circulation assembly 6 are arranged in the height direction, and the gas circulation assembly 6 is suitable for circulating the heated heating medium in the vulcanizing bladder 2. It should be noted that the arrangement of the heating assembly 5 and the gas circulation component 6 in a stacked manner in the axial direction of the center rod 3 does not limit whether the heating assembly 5 and the gas circulation component 6 are in contact with each other or not.

Particularly, when applied to the vulcanizing operation of tires, the item to be vulcanized, such as the raw tire to be vulcanized is placed between the vulcanizing mold 1 and the vulcanizing bladder 2, the vulcanization bladder 2 is clamped and sealed by means of the clamping device 4, the heating medium gas introduced into the vulcanization bladder 2 is heated by the heating assembly 5, and the gas circulation assembly 6 is used to circulate the heated heating medium gas in the vulcanization bladder 2, while the heating assembly 5 and the gas circulation assembly 6 are arranged in the vertical direction outside the central rod 3, which overcomes the defect that the heating assembly 5 and the gas circulation assembly 6 arranged horizontally in the vulcanizing bladder 2 occupy too much space in the prior art, which limits the processing specifications of the vulcanized tire and is not beneficial to the gas circulation in the vulcanizing bladder 2.

In this embodiment, in order to provide the power of the gas circulation assembly 6, it also comprises a drive assembly 7 comprising: a rotating shaft sleeve 71, which is arranged outside the center rod 3 and connected to the gas circulation assembly 6. The rotating shaft sleeve 71 is preferably of hollow structure. The rotating sleeve 71 is sleeved and arranged on the outside of the center rod 3 with a clearance fit. The rotating shaft sleeve 71 arranged on the outside of the center rod 3 with a clearance fit is suitable for rotating on the central rod 3 to drive the gas circulation assembly 6 to perform gas circulation inside the vulcanizing bladder 2. The rotating shaft sleeve 71 can also be located on the outside of the center rod 3 in an offset manner, and connected to the gas circulation assembly 6 through a transmission assembly such as gears. The rotating shaft sleeve 71 can be a non-hollow structure.

The advantage of the vulcanizing equipment provided in this embodiment is that the heating assembly 5 and the gas circulation assembly 6 are arranged in the vertical direction outside the center rod 3, which makes the heating assembly 5 and the gas circulation assembly 6 occupy less radial space in the vulcanizing bladder 2. Providing that the inner radial space of the vulcanized tire must be larger than the coverage of the heating assembly 5 and the gas circulation assembly 6, the heating assembly 5 and the gas circulation arranged vertically along the central rod 3 of the supporting assembly, since they occupy less radial space, can be applied to but not limited to the processing of tires with smaller inner diameter specifications, and the heating assembly 5 and the gas circulation assembly 6 arranged vertically along the axis of the center rod 3 of the supporting assembly will not hinder the flow of air in the vulcanization bladder 2, which is beneficial to the circulation of the heating medium gas in the vulcanization bladder 2 and improves the heat transfer efficiency and the temperature uniformity of the temperature field. At the same time, it is guaranteed that the heating medium gas passes through the heating assembly 5 relatively uniformly in the vertical direction such that the heating efficiency is higher. The invention overcomes the defects in the prior art that the equipment with a vulcanizing bladder 2 horizontally arranged occupies too much space, limits the processing specifications of vulcanized tires, and is not beneficial to the gas circulation in the vulcanizing bladder 2.

On the basis of the above embodiments, as a further defined embodiment, as shown in FIGS. 1-5, the gas circulation assembly 6 comprises an venting member 61.

The venting member 61 is connected to the rotating shaft sleeve 71.

Figure 2:
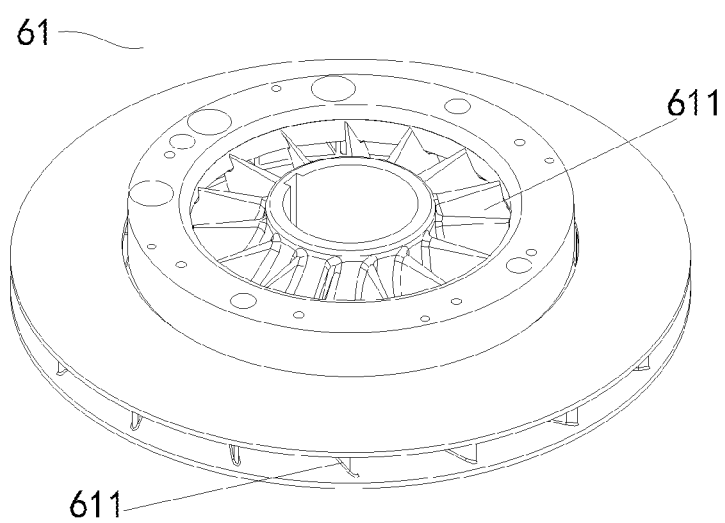
FIG. 2 is a schematic structural view of a venting member provided by the present invention.

Particularly, as shown in FIG. 2, the venting member 61 is driven by the driving assembly 7 to form wind force to provide power for the circulation of the heating medium gas in the vulcanizing bladder 2. The venting member 61 is directly power-connected to the rotating shaft sleeve 71, such that the structure is simple and the service life is long. The venting member 61 may be an open impeller, a closed impeller, an axial fan, and the like.

The venting member 61 can be an open impeller, as shown in FIG. 2, on which guide vanes 611 are arranged, and a guide ring 62 is arranged on the outer peripheral side of the venting member 61 and is installed on the clamping device 4 by a plurality of supporting blocks 63. A gap is provided between two adjacent supporting blocks 63, and an air channel 64 is formed between the venting member 61 and the guide ring 62.

Figure 3:
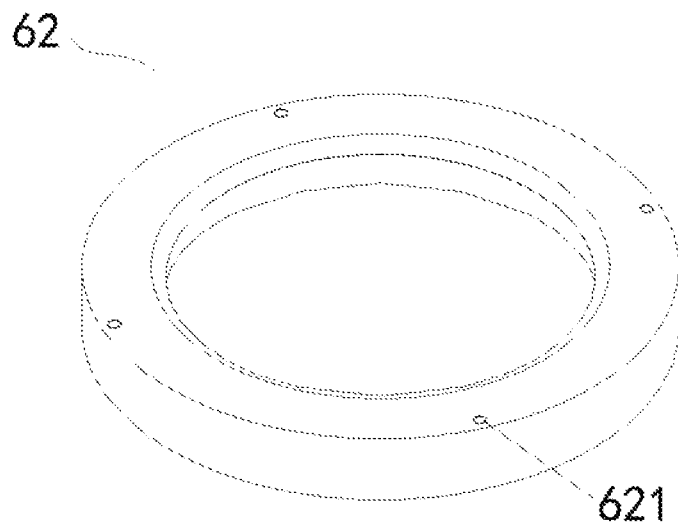
FIG. 3 is a schematic structural view of a guide ring provided by the present invention.

Particularly, as shown in FIG. 3, the supporting blocks 63 are arranged at intervals on the clamping device 4, and the gap formed between two adjacent supporting blocks 63 is suitable for allowing the heating medium gas to pass through via the air channel 64. The supporting blocks 63 is further provided with a guide ring 62 to ensure the fluency of the heating medium gas passing through, while guiding the heating medium gas, such that the heating medium gas flows along the bottom of the vulcanizing bladder 2 to perform gas circulation.

Figure 4:
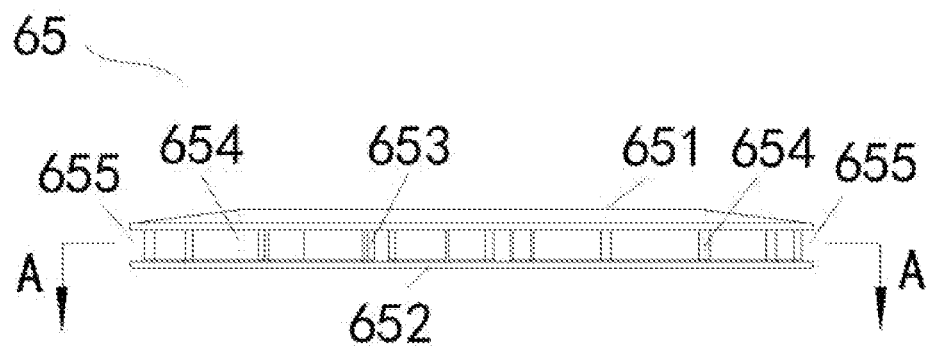
FIG. 4 is a schematic structural view of a diffuser provided by the present invention.
Figure 5:
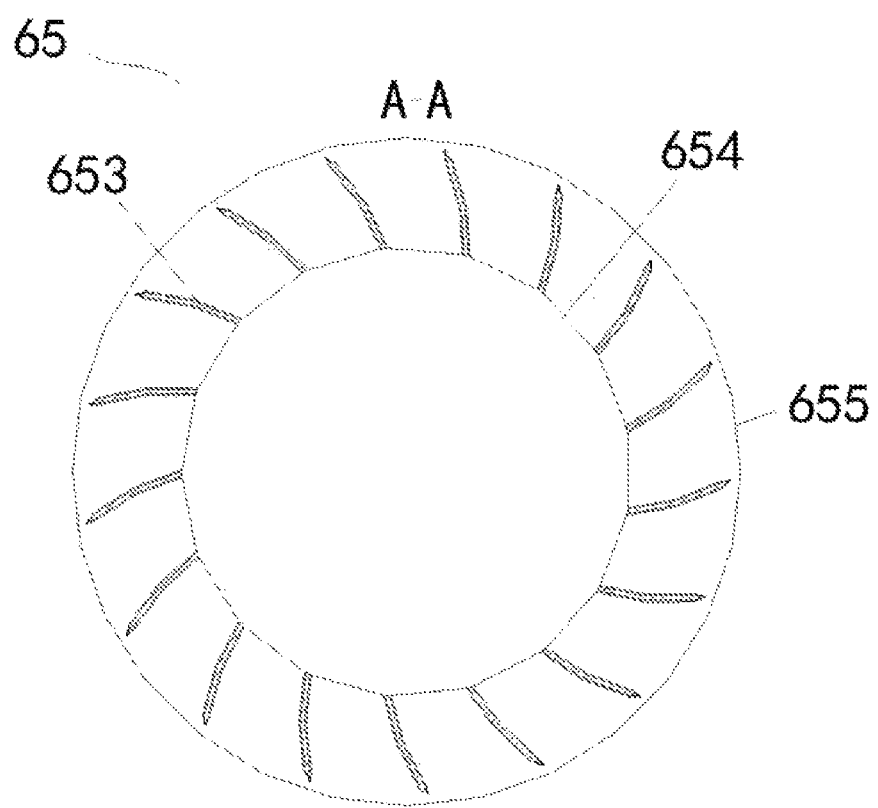
FIG. 5 is a cross-sectional view in A-A direction of the diffuser in FIG. 4.

Further, the gas circulation assembly 6 also comprises a diffuser 65, as shown in FIGS. 4-5. It is arranged at the air channel 64, and the heating medium gas flowing out from the air channel 64 passes through the diffuser 65, such that the flow rate and pressure of the heating medium gas are increased, and the heat exchange efficiency between the heating medium gas and the vulcanizing bladder 2, the heater 52 is increased at a high flow rate, while the temperature uniformity inside the vulcanizing bladder 2 is improved.

Particularly, as shown in FIG. 1, the gas circulation assembly 6 enables the heating medium gas to flow along the circulation path inside the bladder to ensure efficient heat exchange between the heating medium gas and the vulcanizing bladder 2, and improves the uniformity of temperature distribution in the temperature field to ensure the quality and efficiency of tire vulcanizing. The venting member 61 in the gas circulation assembly 6 can be selected as an impeller to provide power for the gas circulation of the heating medium. The guide ring 62 cooperates with the supporting blocks 63 and part of the structure of the clamping device 4 to form an air channel 64. The guide ring 62 can guide the airflow generated by the venting member 61 to converge, and pressurize and guide the airflow entering the air channel 64 through the diffuser 65 arranged at the air channel 64, such that the heating medium gas can flow along the circulation path and at the same time flow in the circumferential direction, further improving the heat transfer efficiency and the temperature uniformity of the temperature field.

Figure 6:
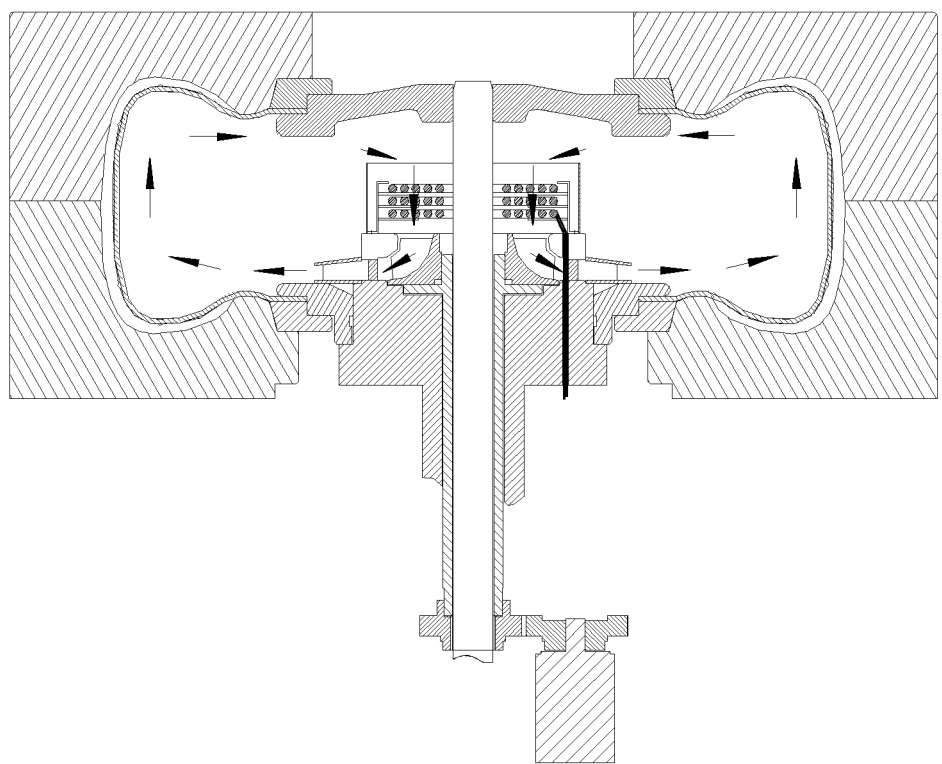
FIG. 6 is a schematic diagram of the flow of the heating medium of the vulcanizing equipment provided in Embodiment 1 of the present invention.

Further, shown in FIG. 6 is a schematic diagram of the flow direction of the heating medium of the vulcanizing equipment. When the drive assembly 7 is rotating forward, the heating medium gas passes through the heating assembly 5 and is heated layer by layer. The heating medium gas passing through the heating assembly 5 is sucked into the venting member 61 due to the action of the venting member 61 in the gas circulation assembly 6 and further exported through the venting member 61, and enters the air channel 64 and the diffuser 65. The high-speed and high-pressure heating medium gas flows along the inner wall of the vulcanizing bladder 2, and after fully exchanging heat with the vulcanizing bladder 2, it finally enters the heating assembly 5 again to be heated, so as to complete a cycle, and such a cycle repeats to improve the uniformity of the internal temperature of the vulcanizing bladder 2. During this process, the guide vanes 611 provided on the venting member 61 and the guide pieces 653 provided on the diffuser 65 are suitable for directing the heating medium gas to the circumferential direction of the vulcanizing bladder 2, thereby further improving the uniformity of the internal temperature of the vulcanizing bladder 2

Figure 7:
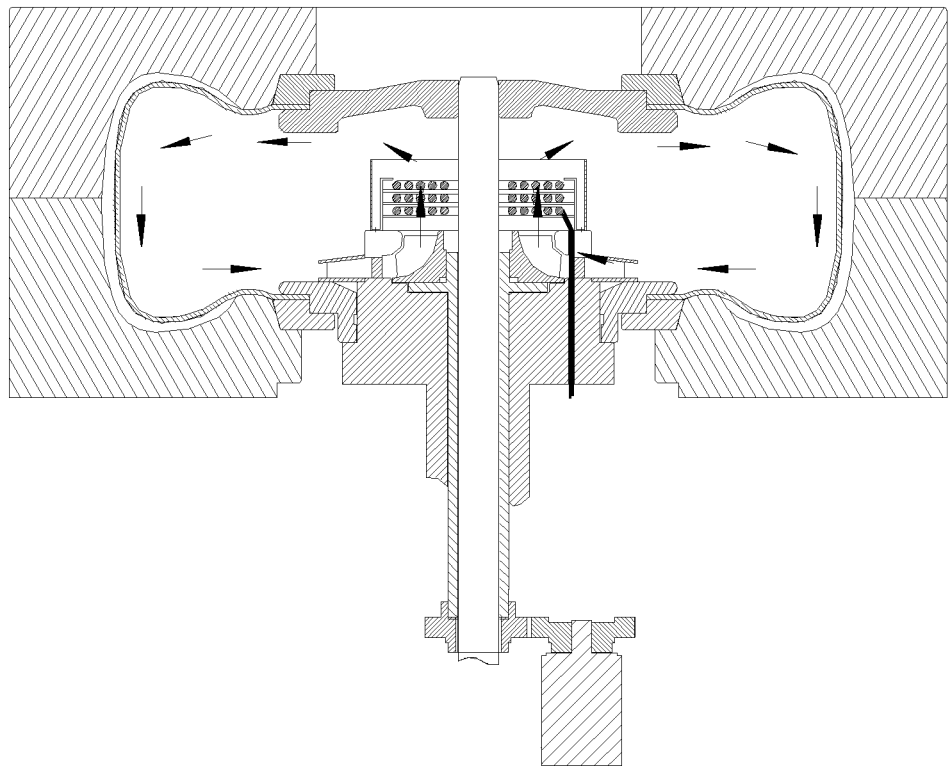
FIG. 7 is another schematic diagram of the flow of the heating medium of the vulcanizing equipment provided in Embodiment 1 of the present invention.

Further, as shown in FIG. 7, another schematic diagram of the flow direction of the heating medium of the vulcanizing equipment is shown. When the driving assembly 7 rotates in the reverse direction, the flow direction of the heating medium gas is opposite to that when the driving assembly 7 rotates forward.

On the basis of the above embodiments, as a further defined embodiment, the venting member 61 is an open impeller.

Particularly, the open impeller cooperates with the guide ring 62, the supporting blocks 63 and part of the clamping device 4 to form an air channel 64. The guide ring 62 can guide the airflow generated by the venting member 61 to converge, and pressurize and guide the airflow entering the air channel 64 through the diffuser 65 arranged at the air channel 64, such that the heating medium gas can flow along the circulation path and at the same time flow in the circumferential direction, further improving the heat transfer efficiency and the temperature uniformity of the temperature field. At the same time, the guide vanes of the open impeller are suitable for guiding the heating medium gas in the circumferential direction of the vulcanizing bladder 2, such that the heating medium gas can circulate in both the horizontal and vertical directions of the vulcanizing bladder 2.

Further, the venting member 61 cooperates with the guide ring 62 and the supporting block 63 to form a technical effect that can be achieved by the assembly, which can be fully realized by the closed impeller, that is, in this embodiment, the combination of the closed impeller venting member 61 and the diffuser 65 can be used to replace the open impeller venting member 61 mating with the combination of the guide ring 62 and the diffuser 65. At this time, support bodies are provided on the outer peripheral side of the closed impeller, and the bracket 51 and the sleeve 53 are provided on the supporting bodies.

An open impeller or a closed impeller can be selected as the venting member in the gas circulation assembly to provide power for the circulation of the heating medium gas. When the opening impeller is selected, the guide ring 62 cooperates with the support blocks 63 and a part of the structure of the clamping device 4, thereby forming an air channel 64, and the guide ring 62 can guide the airflow generated by the venting member to converge. When the closed impeller is selected, it has air channel 64 itself, and it is not needed to provide the guide ring 62.

On the basis of the above embodiments, as a further defined embodiment, as shown in FIG. 1, the heating assembly 5 comprises: a bracket 51 arranged on the guide ring 62 and a heater 52 provided on the bracket 51, the heater 52 being formed with a ventilation portion in the vertical direction.

Particularly, the bracket 51 is arranged on the guide ring 62 such that the heating assembly 5 is located on the upper part of the gas circulation assembly 6 as a whole, maintaining the vertically upward stacking position relationship between the heating assembly 5 and the gas circulation assembly 6, which overcomes the defects in the prior art that the equipment with a vulcanizing bladder 2 horizontally arranged occupies too much space, limits the processing specifications of vulcanized tires, and is not beneficial to the gas circulation in the vulcanizing bladder 2.

Further, the heater 52 is formed with a ventilation portion in the vertical direction, facilitating the heating medium gas in passing through the heater 52 along the circulation path without being hindered, which ensures the smoothness of the heating medium gas circulation. At the same time, the heater 52 can be arranged in multiple layers along the bracket 51, which can be 2-5 layers, and each layer of heater 52 can heat the heating medium gas circulating inside the vulcanizing bladder 2, that is, the heating medium gas circulating inside the vulcanizing bladder 2 can be heated multiple times in one circulation, thereby improving the heating efficiency.

Figure 12:
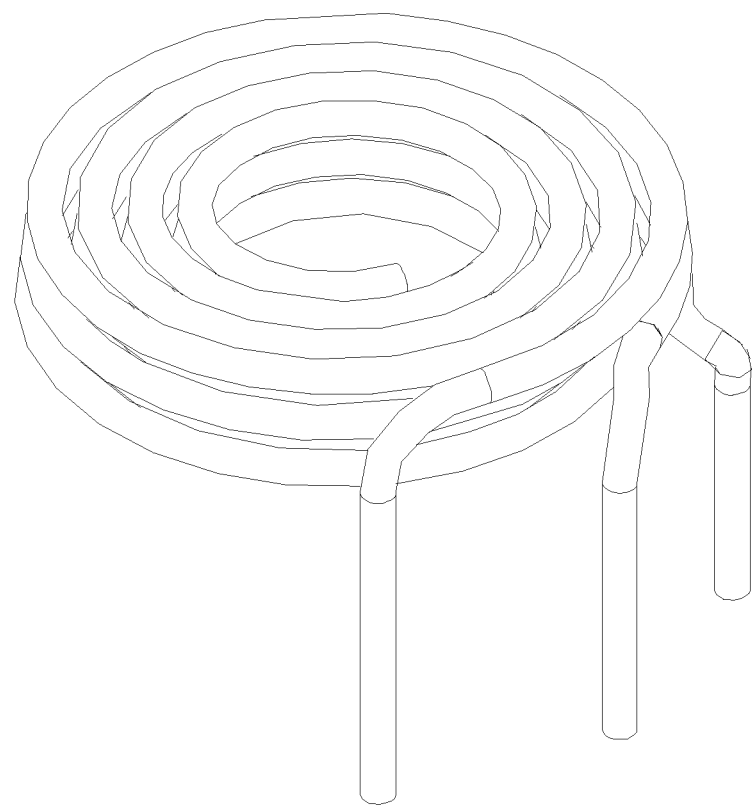
FIG. 12 is a schematic structural view of the heater being a heating coil provided by the present invention.

On the basis of the above embodiments, as a further defined embodiment, as shown in FIG. 12, the heater 52 is a heating coil.

Particularly, a ventilation portion is formed in the middle of the heating coil, facilitating the heating medium gas in passing through the circulation path without being hindered, which ensures the smoothness of the heating medium gas circulation. The space between adjacent heating tubes further facilitates the circulation and heating of the heating medium. At the same time, the heating coil is axially arranged with multiple layers suitable for hovering on the bracket 51, and each layer of heating coil can heat the heating medium gas circulating inside the vulcanizing bladder 2, that is, the heating medium gas circulating inside the vulcanizing bladder 2 can be heated multiple times by the heating coil in one circulation, thereby improving the heating efficiency.

On the basis of the above embodiments, as a further defined embodiment, as shown in FIG. 1, a sleeve 53 is provided outside the heater 52 and is installed on the guide ring 62.

Particularly, the sleeve 53 is arranged on the outside of the heater 52, and the sleeve 53 is installed above the guide ring 62 and attached to the upper surface of the guide ring 62, which can function to guide the heating medium gas and prevent the heating medium gas from leaking between the sleeve 53 and the guide ring 62. The height of the sleeve 53 is set to be higher than the heater 52, which facilitates in guiding the heating medium gas to be collected above the heater 52 and enter the heater 52, thereby improving the smoothness of the heating medium gas circulation. The sleeve 53 can prevent the vulcanizing bladder 2 from directly receiving the heat radiation of the heater, ensure the uniformity of the temperature field inside the vulcanizing bladder 2, and prevent the vulcanizing bladder 2 from being in contact with the heater 52 when it is folded, so as to protect the vulcanizing bladder 2 and prolong the service life of the vulcanizing bladder 2. The sleeve 53 is preferably made of non-metallic material, such as wood, airgel, glass wool and the like.

On the basis of the above embodiments, as a further defined embodiment, as shown in FIG. 1, the clamping device 4 comprises a ring seat 41, a lower clamping ring 42, an upper clamping ring 43 and the like.

The ring seat 41 is provided with an air passage pipeline, and the rotating shaft sleeve 71 passes through the ring seat 41 with clearance fit and is connected with the venting member 61. The air passage pipeline is suitable for leading the heated gas medium into or out of the vulcanizing bladder 2. The rotating shaft sleeve 71 passes through the ring seat 41 with a clearance fit so that the rotating shaft sleeve 71 can rotate relative to the ring seat 41 under the drive of the driving assembly 7.

The lower clamping ring 42 is installed on the ring seat 41, and the lower end of the vulcanizing bladder 2 is clamped between the lower clamping ring 42 and the vulcanizing mold 1; The upper clamping ring 43 is installed on the protruding end of the center rod 3, and the upper end of the vulcanizing bladder 2 is clamped between the upper clamping ring 43 and the vulcanizing mold 1.

Particularly, the clamping device 4 is arranged to clamp and seal the vulcanizing bladder 2 to avoid the leakage of the heating medium gas in the vulcanizing bladder 2, which will reduce the vulcanizing quality of the vulcanizing equipment, and even make it impossible to perform vulcanizing operations. The air passage pipeline provided on the ring seat 41 facilitates in passing the heating medium gas in and out of the vulcanizing bladder 2.

On the basis of the foregoing embodiments, as a further defined embodiment, as shown in FIG. 1, a lower pressure ring 44 is arranged between the lower clamping ring 42 and the vulcanizing mold 1, and an upper pressure ring 45 is arranged between the upper clamping ring 43 and the vulcanizing mold 1, the provisions of the upper clamping ring 44 and the lower clamping ring further seal the vulcanizing bladder 2, so as to improve the sealing performance of the vulcanizing bladder 2 in the vulcanizing equipment.

On the basis of the above embodiments, as a further defined embodiment, as shown in FIGS. 4-5, the diffuser 65 comprises an upper retaining ring 651, a lower retaining ring 652, guide pieces 653 and the like.

The upper retaining ring 651 is in a conical shape;

The lower retaining ring 652 is connected to the upper retaining ring 651 by several guide pieces 653, wherein a wide end 654 and a contracted end 655 are formed between the upper retaining ring 651 and the lower retaining ring 652, the wide end 654 communicating with the air channel 64.

Particularly, a wide end 654 and a contracted end 655 are formed between the upper retaining ring 651 and the lower retaining ring 652. When the heating medium gas flows along the circulation path, the heating medium gas from the air channel 64 pours into the contracted end 655 from the wide end 654, and flow out from the constricted end 655, such that the flow rate and pressure of the outflowing heating medium gas are increased, and the heat exchange efficiency between the heating medium gas, the vulcanizing bladder 2 and the heater 52 is increased at a high flow rate.

Further, the venting member 61 can reach a speed of more than 1500 r/min, and by the action of the diffuser 65, the flow rate at the constricted end 655 of the diffuser 65 can reach more than 0.173 m³/s, and the flow speed can reach more than 12 m/s, which has been significantly improved compared with conventional vulcanizing equipment.

Further, as shown in FIG. 5, the guide pieces 653 are offset toward one side from the inside to the outside, and is suitable for guiding the heating medium gas in the circumferential direction of the vulcanizing bladder 2 during the process of guiding the heating medium gas from the wide end 654 to the constricted end 655, such that the heating medium gas can realize circulating flow in the horizontal and vertical directions of the vulcanizing bladder 2, thereby further improving the uniformity of temperature inside the vulcanizing bladder 2.

On the basis of the above-mentioned embodiments, as a further defined embodiment, as shown in FIG. 1, the drive assembly 7 further comprises a transmission member acting between the rotating shaft sleeve 71 and the driving motor 72. The transmission member acting between the rotating shaft sleeve 71 and the driving motor 72 power-connects to the drive motor 72 and the rotating shaft sleeve 71, and the external power provided by the driving motor 72 is transmitted to the rotating shaft sleeve 71 and further transmitted to the venting member 61 by the rotating shaft sleeve 71 to provide power for the gas circulation of the heating medium gas.

On the basis of the above-described embodiments, as a further defined embodiment, as shown in FIG. 1, the transmission member is a gear pair comprising a first gear 73 arranged on the driving motor 72 and rotates synchronously with the motor shaft; and a second gear 74 arranged on the rotating shaft sleeve 71 and engaging with the first gear 73. The gear pair is used to facilitate power transmission and provide power for the gas circulation of the heating medium gas. As a variant, the transmission member can also be a common transmission mechanism in the prior art such as a chain transmission and a belt transmission, without too much limitation.

On the basis of the above-mentioned embodiments, as a further defined embodiment, as shown in FIG. 1, the ring seat 41 is provided with a wire passing pipeline 8, and the guide ring 62 is provided with a through hole 621, and the wire 54 passes through the wire passing pipeline 8 and the through hole 621 to connect to the heating assembly 5.

Particularly, the ring seat 41 is provided with a wire passing pipeline 8, and the guide ring 62 is provided with a through hole 621, which facilitates in passing the wire 54, and is suitable for connecting an external power supply device to a heating assembly 5 to provide heating power for the heater 52.

The advantages of this embodiment is that the heating assembly 5 and the gas circulation assembly 6 are arranged in the vertical direction outside the center rod 3, occupying less radial space in the vulcanizing bladder 2, and can be applied to, but not limited to, processing tires with smaller inner diameter specifications, and the heating assembly 5 and the gas circulation assembly 6 arranged vertically along the axis of the center rod 3 of the supporting assembly will not hinder the flow of air in the vulcanizing bladder 2, which is beneficial to the circulation of the heating medium gas in the vulcanizing bladder 2, improving heat transfer efficiency, and temperature uniformity of the temperature field. At the same time, it is ensured that the heating medium gas passes through the heating assembly 5 relatively uniformly in the vertical direction such that the heating efficiency is higher. The invention overcomes the defects in the prior art that the equipment with a vulcanizing bladder 2 horizontally arranged occupies too much space, limits the processing specifications of vulcanized tires, and is not beneficial to the gas circulation in the vulcanizing bladder 2.

Embodiment 2

Figure 8:
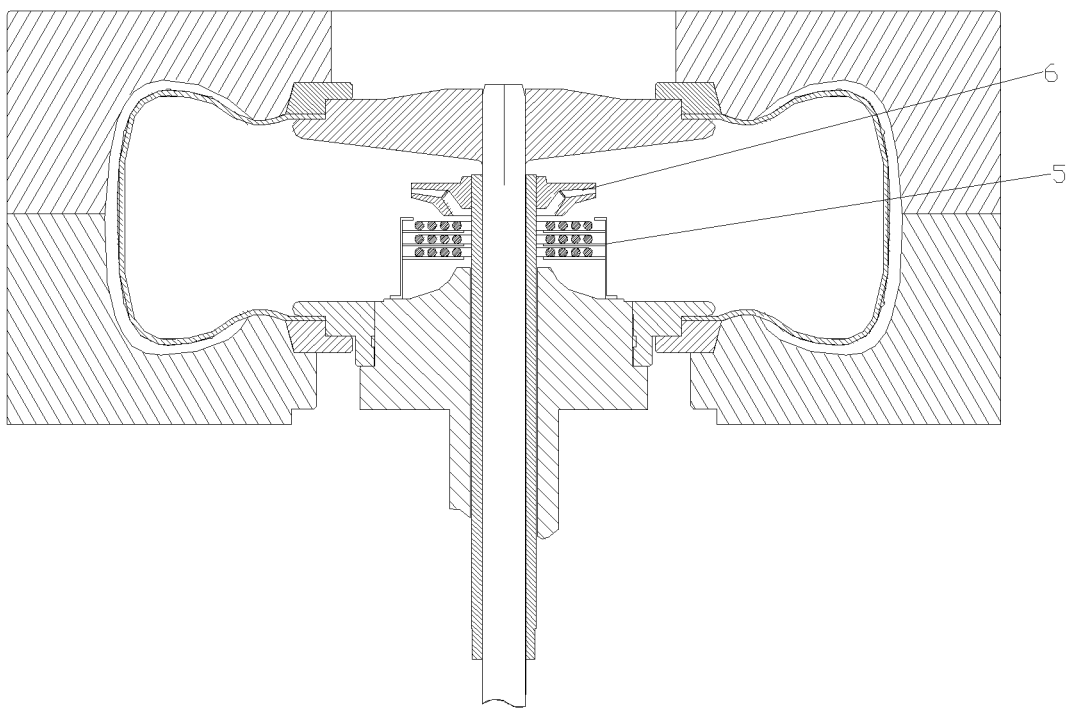
FIG. 8 is a schematic structural view of another vulcanizing equipment provided in Embodiment 2 of the present invention.

This embodiment provides a vulcanizing equipment, as shown in FIG. 8, differing from Embodiment 1 in that the heating assembly 5 and the gas circulation assembly 6 are arranged in the vulcanizing bladder 2 in a stacked manner in the axial direction of the center rod 3, and the positions of the heating assembly 5 and the gas circulation assembly 6 is interchanged such that the gas circulation assembly 6 is located above the heating assembly 5.

Particularly, the heating assembly 5 is arranged on the ring seat 41, and the rotating shaft sleeve 71 is extended along the center rod 3 to the depth of the vulcanizing bladder 2, so that the venting member 61 of the gas circulation assembly 6 is located above the heating assembly 5, and the position of the ring seat 41 corresponding to the lower part of the heating assembly 5 is designed in a conical shape for guiding flow, which facilitate in guiding the heating medium gas.

Figure 9:
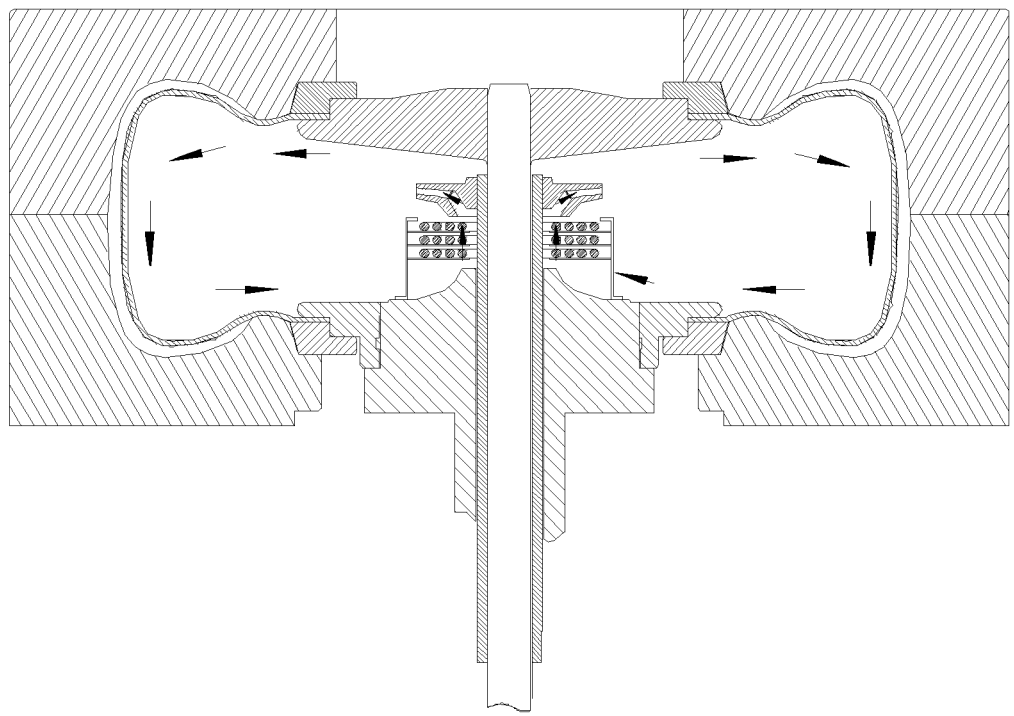
FIG. 9 is a schematic diagram of the flow of the heating medium of the vulcanizing equipment provided in Embodiment 2 of the present invention.

Further, as shown in FIG. 9 which is a schematic diagram of the flow direction of the heating medium of the vulcanizing equipment provided by this embodiment, when the drive assembly 7 rotates forward, the heating medium gas passes through the heating assembly 5 and is heated layer by layer. The heating medium gas passing through the heating assembly 5 is sucked into the venting member 61 due to the action of the venting member 61 in the gas circulation assembly 6 and further exported through the venting member 61, flows along the inner wall of the vulcanizing bladder 2, and after fully exchanging heat with the vulcanizing bladder 2, it finally enters the heating assembly 5 through the ring seat 41 having a guiding effect again, to be heated, so as to complete a cycle, and such a cycle repeats to improve the uniformity of the internal temperature of the vulcanizing bladder 2. During this process, the guide vanes 611 provided on the venting member 61 are suitable for directing the heating medium gas to the circumferential direction of the vulcanizing bladder 2, thereby further improving the uniformity of the internal temperature of the vulcanizing bladder 2

Figure 10:
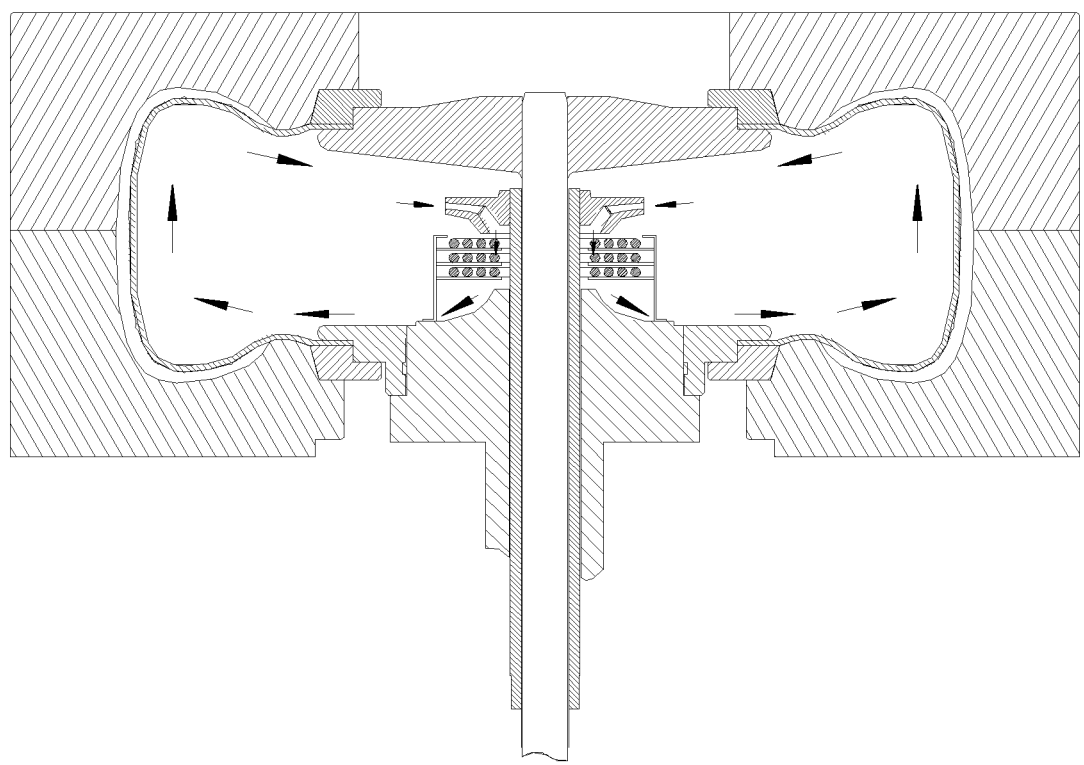
FIG. 10 is another schematic diagram of the flow of the heating medium of the vulcanizing equipment provided in Embodiment 2 of the present invention.

Further, as shown in FIG. 10, another schematic diagram of the flow direction of the heating medium of the vulcanizing equipment provided by this embodiment is shown. When the driving assembly 7 rotates in the reverse direction, the flow direction of the heating medium gas is opposite to that when the driving assembly 7 rotates forward.

The advantage of this embodiment is that: using the positional characteristics of the ring seat 41, a part of the ring seat 41 corresponding to the position below the heating assembly 5 is set in a conical shape for guiding flow, which is used to guide the heating medium gas, and the guide ring 62, support block 63, diffuser 65 and other components in the gas circulation assembly 6 are omitted, so as to realize the gas circulation of the heating medium in the vulcanization bladder 2 with a simpler equipment structure, improving the heat transfer efficiency and the temperature uniformity of the temperature field. At the same time, it is ensured that the heating medium gas passes through the heating assembly 5 relatively uniformly in the vertical direction such that the heating efficiency is higher. It overcomes the defects in the prior art that the equipment with a vulcanizing bladder 2 horizontally arranged takes up too much space, limits the processing specifications of vulcanized tires, and is not beneficial to the gas circulation in the vulcanizing bladder 2.

Obviously, the above embodiments are merely examples for clarity rather than limiting the implementation. For a person of ordinary skill in the art, there are other variations or changes that can be made in different forms based on the above description. It is not necessary or possible to exhaust all embodiments here. The obvious variations or changes derived therefrom are still within the scope of protection of the invention.

What is claimed is:

1. A vulcanizing equipment, comprising:
   a vulcanizing mold configured to be able to open and close, in which a vulcanizing cavity is formed;
   a vulcanizing bladder suitable for being placed in the vulcanizing cavity;
   a supporting assembly comprising a center rod and a clamping device provided on the center rod, the clamping device being suitable for installing the vulcanizing bladder in the cavity in a sealed manner;
   a heating assembly and a gas circulation assembly provided in the vulcanizing bladder in a stacked manner in an axial direction of the center rod, the gas circulation assembly being suitable for circulating a heating medium gas in the vulcanizing bladder; and
   a driving assembly comprising a rotating shaft sleeve provided outside the center rod and connected to the gas circulation assembly,
   wherein the center rod can be raised to contract the vulcanizing bladder, and
   wherein the heating assembly comprises a heater forming a ventilation portion in a vertical direction, a sleeve is provided outside the heater, a height of the sleeve is set to be higher than the heater, which facilitates in guiding the heating medium gas to be collected above the heater and enter the heater, thereby improving a smoothness of the heating medium gas circulation.

2. The vulcanizing equipment according to claim 1, wherein the gas circulation assembly comprises:
   a venting member connected to the rotating shaft sleeve.

3. The vulcanizing equipment according to claim 2, wherein the venting member is an open impeller and the gas circulation assembly further comprises:
   a guide ring installed on the clamping device by means of a plurality of supporting blocks, wherein a gap is provided between two adjacent supporting blocks, and an air channel is formed between the venting member and the guide ring; and
   a diffuser provided at the air channel.

4. The vulcanizing equipment according to claim 2, wherein the venting member is a closed impeller, the venting member having an air channel at which a diffuser is provided.

5. The vulcanizing equipment according to claim 3, wherein the heating assembly comprises a bracket and the heater arranged on the bracket, the bracket being fixedly provided on the guide ring and;
   the sleeve being installed on the guide ring.

6. The vulcanizing equipment according to claim 4, wherein the heating assembly comprises a bracket and the heater provided on the bracket, wherein a supporting body is provided on an outer peripheral side of the closed impeller, and the bracket and the sleeve are provided on the supporting body.

7. The vulcanizing equipment according to claim 5, wherein the heater is a heating coil, and the heating coil is axially provided with multiple layers.

8. The vulcanizing equipment according to claim 1, wherein the heating assembly is fixedly provided on the clamping device, and the heating assembly is located above the gas circulation assembly.

9. The vulcanizing equipment according to claim 2, wherein the clamping device comprises:
   a ring seat on which an air passage pipeline is arranged, wherein the rotating shaft sleeve passes through the ring seat with clearance fit and is connected to the venting member;
   a lower clamping ring installed on the ring seat, a lower end of the vulcanizing bladder being clamped between the lower clamping ring and the vulcanizing mold;
   an upper clamping ring installed on a protruding end of the center rod, an upper end of the vulcanizing bladder being clamped between the upper clamping ring and the vulcanizing mold; and
   a lower pressing ring is provided between the lower clamping ring and the vulcanizing mold, and an upper pressing ring is provided between the upper clamping ring and the vulcanizing mold.

10. The vulcanizing equipment according to claim 3, wherein the diffuser comprises:
    an upper retaining ring in a conical shape; and
    a lower retaining ring connected to the upper retaining ring via a plurality of guide pieces, wherein a wide end and a contracted end are formed between the upper retaining ring and the lower retaining ring, the wide end communicating with the air channel.

11. The vulcanizing equipment according to claim 1, wherein the driving assembly further comprises a transmission member acting between the rotating shaft sleeve and a driving motor; and wherein the rotating shaft sleeve is provided outside the center rod in a clearance fit manner.

12. The vulcanizing equipment according to claim 11, wherein the transmission member is a gear pair comprising:
   a first gear provided on the drive motor that rotates synchronously with a motor shaft; and
   a second gear provided on the rotating shaft sleeve that engages with the first gear.

13. The vulcanizing equipment according to claim 5, wherein a wire-passing pipeline is provided on a ring seat, and a through hole is provided on the guide ring, wherein a wire is connected to the heating assembly through the wire-passing pipeline and the through hole.

14. The vulcanizing equipment according to claim 6, wherein the heater is a heating coil, and the heating coil is axially provided with multiple layers.

\* \* \* \* \*